2,734,090
PREPARATION OF VINYLIDENE FLUORIDE

John D. Calfee, Dayton, Ohio, and Charles B. Miller, Lynbrook, N. Y., assignors to Allied Chemical & Dye Corporation, New York, N. Y., a corporation of New York No Drawing. Application November 17, 1950, Serial No. 196,346

2 Claims. (Cl. 260—653)

This invention relates to a process for preparing 1,1-difluoroethene by dechlorination with hydrogen in the vapor phase of 1,1-difluoro-1,2-dichloroethane.

1,1-difluoroethene (vinylidene fluoride) has been prepared in the past by dechlorination in the liquid phase of 1,1-difluoro-1,2-dichloroethane by reaction with zinc in the presence of anhydrous solvents such as acetamide, 2-ethylhexanol, ethanol, etc. This process has the disadvantage of necessitating the use of expensive zinc and anhydrous organic solvents and in requiring removal of by-product zinc chloride.

We have now found that 1,1-difluoroethene may advantageously be prepared according to our process which is adapted for continuous, as well as batch, operation by reacting hydrogen with 1,1-difluoro-1,2-dichloroethane, in the vapor phase at temperatures between about 450° C. and about 600° C. in the presence of a mild, nickel hydrogenation catalyst such as a metallic nickel catalyst.

The reaction may be illustrated by the equation below:

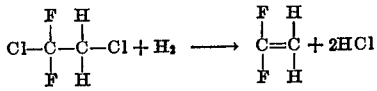

In carrying out the process according to our invention, hydrogen and the flourochloroethane are mixed in any suitable manner, conveniently by bubbling a stream of hydrogen through the liquid fluorochloroethane at such a temperature and such a rate that the desired amount of fluorochloroethane is vaporized and emerges with the hydrogen in a vaporous mixture.

The vapor mixture is then subjected to a temperature within the range of about 450° C. to about 600° C. for a period sufficient to bring about the dechlorination reaction, i. e. the removal of two chlorine atoms, one from each of the two carbon atoms of the fluorochloroethane, preferably for a time sufficient to insure complete reaction of all the hydrogen in the mixture in order to avoid the necessity for removing hydrogen from the finished product. The HCl formed in the reaction is then removed, for example by scrubbing the vapors with water or aqueous alkali. The reaction vapors are then treated to remove the major portion of the unreacted fluorochloroethane, for example by refrigeration to a suitably low temperature. The remaining gas is then treated, as by further refrigeration to a temperature low enough to condense the lower boiling fluoroethene product and the small remaining portion of the unreacted fluorochloroethane material, the latter being readily removed by distillation. The resulting 1,1-difluoroethene is condensed under pressures and temperatures suitable for confining this low boiling compound.

The hydrogen and fluorochloroethane reactants may be mixed in any desired proportions, conveniently in the equimolecular proportions in which they combine or preferably using less than an equimolecular quantity of hydrogen, for example about .80 mol of hydrogen per 1 mol of fluorochloroethane compound, as the unreacted fluorochloroethane may readily be recycled, whereas unreacted hydrogen, if present, is difficult to remove, involving a complicated distillation or other difficult or expensive separation process. It is, therefore, advantageous and preferable to adjust the ratios and reaction temperature and time so that hydrogen is completely reacted in order to avoid the above difficulty.

The temperatures at which the reaction may be carried out at normal atmospheric pressures or superatmospheric pressures lie in the range from about 450° C. to about 600° C. At temperatures lower than about 450° C., little or no reaction is obtained, whereas at temperatures above about 600° C., decomposition of the fluorochloroethane reactant begins to take place resulting in defluorination and carbonization. The preferred temperature using a metallic nickel catalyst is between about 490° C. and about 550° C.

The reaction rate at the temperatures specified is usually quite rapid, so that the contact time is not especially critical, depending, however, somewhat on the intimacy of mixing of the reactants, the ratio of hydrogen to fluorochloroethane compound used, etc. Under conditions of passage of the mixed vapors through a conventional packed reactor, the contact time of the vapor mixture with the heated packing material usually is at least about 10 seconds to effect about a 40–45% conversion and may be longer if more hydrogen is to be utilized and a higher conversion effected.

The hydrogen chloride formed in the reaction may be removed in any suitable manner, for example by contacting the mixed gases with water or aqueous alkaline material in a conventional manner.

Since the unreacted fluorochloroethane material has a boiling point higher than the fluoroethene product, as shown below:

| | Boiling point |
|---|---|
| 1,1-difluoro-1,2-dichloroethane | ° C.__ 46.8 |
| 1,1-difluoroethene | ° C.__ −83 | it is convenient to first separate the unreacted fluorochloroethane material from the HCl-free mixed reaction gases, as by condensation, and then recover the fluoroethene product by further condensation, for example at lower temperatures and/or higher pressures. At atmospheric pressures, the gaseous fluoroethene product may be condensed, for example at about −200° C. (the temperature of liquid nitrogen), or at about 15 p. s. i., at about −78° C. or at 300 p. s. i., at about 0° C., etc.

Reaction with hydrogen of the fluorochloroethane specified is strongly promoted by the aid of a mild, nickel hydrogenation catalyst, metallic nickel catalyst being preferred. More active hydrogenation catalysts such as reduced nickel (e. g. nickel deposited on active carbon from a nickel formate solution and reduced at 270°–350° C.) are unsatisfactory as they result in decomposition, i. e. defluorination and carbonization, of the fluorochloroethane.

While conversions of fluorochloroethane will be relatively low percentagewise in the preferred cases where the ratio of hydrogen to fluorochloroethane is less than 1, and will depend to a large extent on the ratio employed, nevertheless, yields based on fluorochloroethane attacked are nearly quantitative and are reduced primarily only by mechanical losses experienced in the recovery steps.

The removal of a chlorine atom from each of the two carbon atoms of the 1,1-difluoro-1,2-dichloroethane results in the production of an unsaturated compound which is useful in carrying out polymerization reactions, either of the individual compound with itself or with other compounds to produce polymers or copolymers useful as films, plastics and the like.

Example

A stream of hydrogen was bubbled through liquid 1,1-difluoro-1,2-dichloroethane at about 30°–35° C. for three hours at a rate of four parts per hour and the resulting vaporous mixture totaling 12 parts (6 mols) of hydrogen and 445 parts (3.3 mols) of 1,1-difluoro-1,2-dichloroethane was passed through a reactor heated to 490°–500° C. packed with nickel wire helices. The contact time was about 10 seconds. The emerging gases were scrubbed with water to remove HCl, dried over $CaCl_2$ and then passed through a trap held at –78° C., wherein 177 parts (the major portion) of unreacted 1,1-difluoro-1,2-dichloroethane (B. P. +47) was condensed. The remaining gas was led through a second condenser held at liquid N temperature (–200° C.) and atmospheric pressure, wherein the gases were condensed yielding 10 parts of unreacted 1,1-difluoro-1,2-dichloroethane and 89 parts of 1,1-difluoroethene (vinylidene fluoride), equivalent to 43% conversion of the fluorochloroethane for the single pass.

While the above describes the preferred embodiments of our invention, it will be understood that departures may be made therefrom within the scope of the specification and claims.

We claim:

1. In a process for preparing 1,1-difluoroethene, the step which comprises subjecting a mixture of hydrogen and 1,1-difluoro-1,2-dichloroethane in the vapor phase to a temperature between about 450° C. and about 600° C. in the presence of a metallic nickel catalyst.

2. In a process for preparing 1,1-difluoroethene, the step which comprises subjecting a mixture of hydrogen and 1,1-difluoro-1,2-dichloroethane in the vapor phase to a temperature between about 490° C. and about 550° C. in the presence of a metallic nickel catalyst.

References Cited in the file of this patent

UNITED STATES PATENTS

| | | |
|---|---|---|
| 2,504,919 | Bordner | Apr. 18, 1950 |
| 2,551,573 | Downing et al. | May 8, 1951 |
| 2,615,925 | Bordner | Oct. 28, 1952 |